J. T. CAMPBELL.
INDICATOR.
APPLICATION FILED JUNE 16, 1913.

1,108,489. Patented Aug. 25, 1914.

Witnesses
Philip E. Barnes
E. J. Sheehy

Inventor
J. T. Campbell
By James J. Sheehy & Co.
Attorneys

UNITED STATES PATENT OFFICE.

JOHN T. CAMPBELL, OF NORFOLK, VIRGINIA, ASSIGNOR OF ONE-HALF TO CLIFTON G. KEESEE, OF NORFOLK, VIRGINIA.

INDICATOR.

1,108,489.     Specification of Letters Patent.     Patented Aug. 25, 1914.

Application filed June 16, 1913. Serial No. 773,990.

*To all whom it may concern:*

Be it known that I, JOHN T. CAMPBELL, citizen of the United States, residing at Norfolk, in the county of Norfolk and State of Virginia, have invented new and useful Improvements in Indicators, of which the following is a specification.

My present invention pertains to indicators; and it contemplates the provision of an indicator through the medium of which the owner of an automobile may readily ascertain the amount of gasolene consumed by the machine while the same is out of his possession and in that way detect when the machine has been surreptitiously used by a chauffeur or other person, and determine the extent of the unauthorized use.

Figure 1:
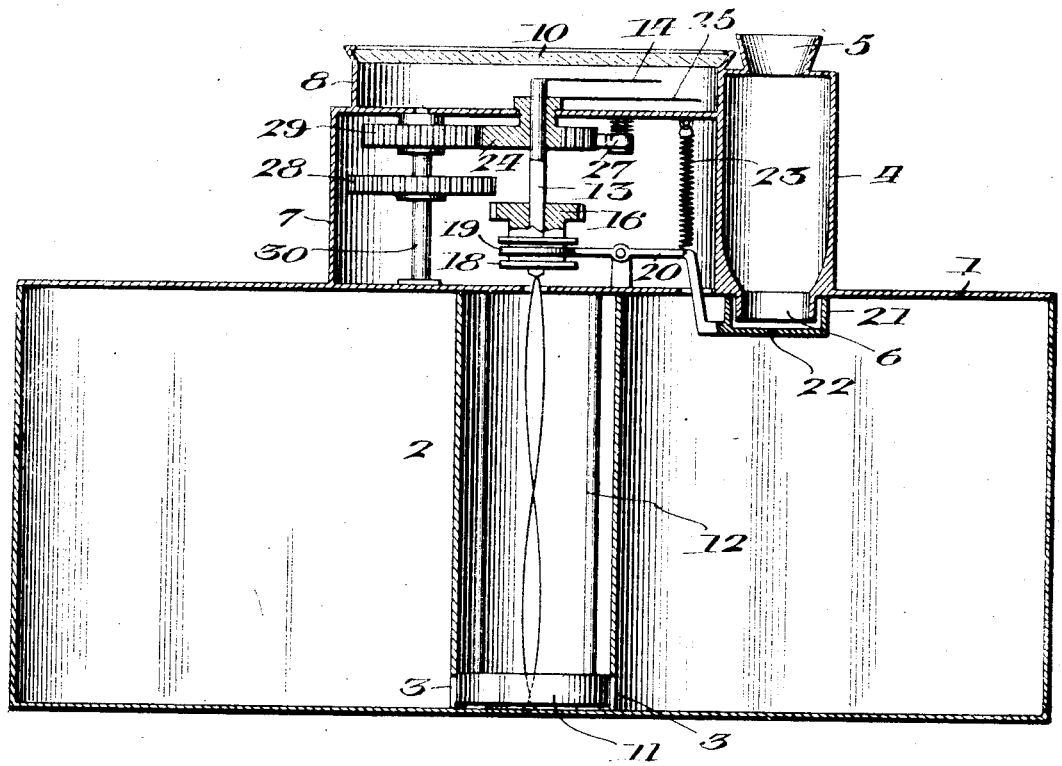
Figure 2:
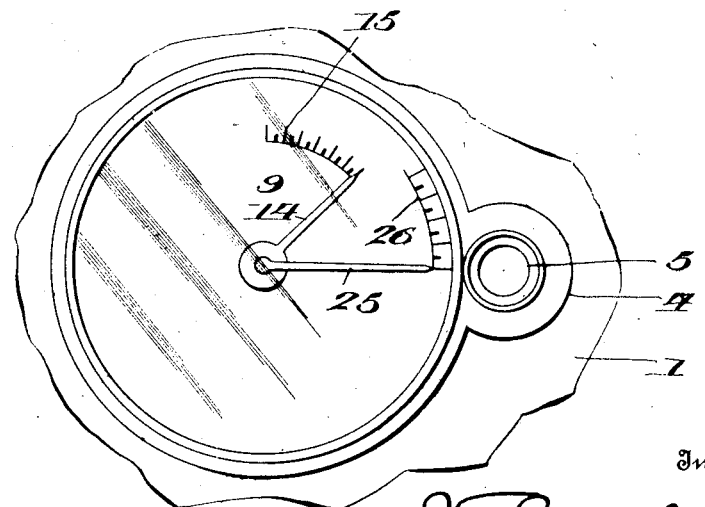

With the foregoing in mind, the invention will be fully understood from the following description and claims, when the same are read in connection with the drawings, accompanying and forming part of this specification, in which:

Figure 1 is a vertical section, partly in elevation, of the apparatus constituting the best practical embodiment of my invention that I have as yet devised. Fig. 2 is a detail plan showing the dial face and the indicator hands or pointers above the same.

Similar numerals of reference designate corresponding parts in both views of the drawings.

In furtherance of my invention I arrange in the gasolene tank 1 of an automobile an upright tube 2 having apertures 3 at its lower end through which its interior is connected with that of the tank. I also arrange on the tank 1 a filling tube 4 having a funnel and also having a reduced portion 6 that depends into and designed to communicate with the interior of the tank 1, as hereinafter described.

Arranged above the tank 1 and preferably at one side of the filling tube 4 is a casing 7, and superimposed on the casing 7 is a sub-casing 8 which has a dial face 9 on its bottom and also has a transparent upper wall 10.

Movable vertically and held against rotation in the tube 2 is a float 11. Rotary movement of the said float may be prevented by any means consonant with the purpose of my invention without departure from the claimed scope of the same. I prefer, however, to accomplish such purpose through the medium of fixed upright rods 12 which rest in apertures provided in the float and serve to effectually prevent rotary motion of the float without interfering with vertical movement thereof.

Journaled at its lower and upper ends in suitable bearings and resting in the center of the tube 2 is a shaft 13. The portion of the said shaft within said tube 2 is twisted, and is adapted to extend through an oblong aperture in the float 11, so as to assure upward and downward movements of the float being attended by rotation of the shaft about its axis. At its upper end the shaft 13 has fixed thereto a hand 14, designed to coöperate with the inner graduated scale 15, Fig. 2.

Mounted on the upper flat portion of the shaft 13 so as to turn with the shaft and move vertically thereon is a gear 16. The said gear 16 is provided with a circumferentially grooved extension 18 which receives in its groove the fork on one arm of a vertically swinging lever 20, the other arm of which terminates in a cup 21 having a small drain aperture 22. The said lever is returned to and normally held in a yielding manner in the position shown through the medium of a retractile spring 23, and it will be noticed in this connection that vertical movement of the gear 16 as well as vertical movement of the cup 21 are controlled by said spring through the medium of said lever.

Journaled and adapted to freely turn in the upper wall of the casing 7 is the sleeve of a spur gear 24 that loosely receives the upper portion of the shaft 13 and is provided with a hand or pointer 25, designed to coöperate with the outer circular graduated scale 26, shown in Fig. 2.

Suitably connected with the upper wall of the casing 7 is a spring-controlled dog 27 designed to coöperate with the gear 24 and prevent casual or too free rotation of said gear, while journaled in the lower and upper walls of said casing is a shaft having fast thereon spur gears 28 and 29; the gear 28 being for coöperation with the gear 16, and the gear 29 being intermeshed with and adapted to impart rotary motion to the gear 24.

In the practical use of my novel indicator, gasolene is poured into the tank 1 through the filling tube 4. During the said pouring and in fact at the commencement thereof, the outer arm of the lever 20 is depressed by the weight of the gasolene in the cup 21, and hence the inner arm of said lever and the gear 16 are raised and the latter is intermeshed with the gear 28 so that as the float 11 is raised by the gasolene and the shaft 13 is rotated, the gear 16 through the gear 28, shaft 30 and gear 29 will rotate the gear 24 and the hand 25 thereon, whereupon the said hand 25 by coöperation with the scale 26 will indicate the amount of gasolene placed in the tank. The rotation of the gear 28 through the gear 16 will continue during the pouring of gasolene into the tank 1 and for a brief period after such pouring—i. e., until the gasolene drains through the aperture 22 from the cup 21, whereupon the spring 23 will rock the lever 20 and move the gear 16 downwardly out of engagement with the gear 28. From this it follows that after the putting of gasolene in the tank 1, the hand 25 will remain in the position to which it is moved by the upward movement of the float 11, and this independently of rotation of the shaft 13 due to downward movement of the float 11 as when gasolene passes from the tank incidental to use of the car. When the float 11 gravitates because of gasolene passing from the tank 1, the shaft 13 and the hand 14 will be turned in reverse direction, and the hand will indicate the amount of gasolene that is taken from the tank and is consumed in the operation of the car. From this it follows that by making note of the positions of the hands 25 and 14 when the car is put in the garage, the owner is enabled to tell when he again takes possession of the car whether or no it has been operated while out of his possession. In this connection it will be manifest that if the supply of gasolene in the tank 1 is surreptitiously replenished while the car is out of the possession of the owner, any change in the position of the hand 25 will make such fact patent to the owner and put him on notice that the car had been operated without authority. It will also be manifest that the changed position of the hand 14 will apprise the owner of the unauthorized use of the machine, irrespective of whether or no the position of the hand 25 is changed by the putting of a fresh supply of gasolene in the tank 1. It is also to be understood from the foregoing that the hand 25, which rotates in only one direction, tends to sum up the total amount of liquid supplied at different times to the tank.

Having described my invention, what I claim and desire to secure by Letters-Patent, is:

1. In an indicator, the combination of a tank, a vertically-movable float controlled by liquid in the tank and held against rotation, a shaft constructed and arranged to be rotated by vertical movement of the float and provided with a hand, a gear mounted on the shaft to turn therewith and move vertically thereon, a gear movable independently of the shaft and having a hand, a dial having scales complementary to the hands, gearing connected with the latter gear and arranged to be engaged and moved by the vertically movable gear, a tube through which the tank is charged, a vertically swinging lever having one of its arms connected with the vertically movable gear and also having a cup on its other arm, arranged to receive liquid from the said tube and provided with a drain aperture, and a spring for returning said lever to its normal position.

2. In an indicator, the combination of a tank, a vertically-movable float controlled by liquid in the tank and held against rotation, a shaft constructed and arranged to be rotated by vertical movement of the float, a gear mounted on the shaft to turn therewith and move vertically thereon, a gear movable independently of the shaft and having a hand, a dial having a scale complementary to the hand, gearing connected with the latter gear and arranged to be engaged and moved by the vertically movable gear, a tube through which the tank is charged, a vertically swinging lever having one of its arms connected with the vertically movable gear and also having a cup on its other arm arranged to receive liquid from the said tube and provided with a drain aperture, and a spring for returning said lever to its normal position.

3. In an indicator, the combination of a tank, a pointer, a graduated scale complementary thereto, means controlled by the rise and fall of liquid in the tank for moving said pointer, a second pointer, a graduated scale complementary thereto, a driving connection for the second pointer, comprising a movable element actuated by the rise and fall of liquid in the tank and adapted to be engaged with and disengaged from the remainder of the driving connection, means for moving the said element into engagement with the remainder of the driving connection when liquid is poured into the tank, said means being actuable by the pouring of liquid into the tank, and means for moving said element out of engagement with the remainder of the driving connection when the supply of liquid to the tank is discontinued.

4. In an indicator, the combination of a tank, a movable pointer, means controlled by the rise of liquid in the tank, connections whereby said means control said pointer, said connections being constructed and arranged to be interrupted and reëstablished, means for establishing the said connections when liquid is placed in the tank, said means being actuable by the pouring of liquid into the tank, and means for interrupting the connections when the placing of liquid in the tank is discontinued.

In testimony whereof I have hereunto set my hand in presence of two subscribing witnesses.

JOHN T. CAMPBELL.

Witnesses:
W. R. PAYNE,
J. H. GLASS.